(12) United States Patent
Murayama

(10) Patent No.: US 6,433,893 B1
(45) Date of Patent: *Aug. 13, 2002

(54) DATA COMMUNICATION APPARATUS FOR COMBINING DATA WITH THE SAME IDENTIFICATION INFORMATION

(75) Inventor: Masahiro Murayama, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/637,179

(22) Filed: Apr. 24, 1996

(30) Foreign Application Priority Data

Apr. 25, 1995 (JP) .............................. 7-101196

(51) Int. Cl.⁷ ................................ H04N 1/21
(52) U.S. Cl. ...................... 358/434; 358/468
(58) Field of Search .................. 358/400, 402–404, 358/407, 434, 468, 448, 453, 401; 395/117, 616

(56) References Cited

U.S. PATENT DOCUMENTS

| | | | | |
|---|---|---|---|---|
| 4,264,808 A | * | 4/1981 | Owens et al. ................ | 235/379 |
| 4,321,626 A | * | 3/1982 | Wada .......................... | 358/263 |
| 4,571,699 A | * | 2/1986 | Herzog et al. .............. | 364/900 |
| 5,381,240 A | | 1/1995 | Murayama .................. | 358/436 |
| 5,452,099 A | * | 9/1995 | Von Meister ............... | 358/403 |
| 5,461,488 A | * | 10/1995 | Witek ......................... | 358/402 |

\* cited by examiner

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

A document terminated by error due to communication error during the reception is retransmitted starting from the error page to complete the document. The received document is stored in a memory. Each document is assigned with a sending station ID and a document ID which are stored in a RAM. When the reception is terminated by error, the data received so far is stored for a predetermined time and if the retransmission is made within the predetermined time, it is linked to the previously stored received data.

22 Claims, 8 Drawing Sheets

FIG. 4

| NETWORK NUMBER 401 | USER NAME 402 | PRIORITY 403 | PROXY USER NAME 404 |
|---|---|---|---|
| 1000 | Supervisor | 1 | Kondo |
| 1000 | Abe | 2 | Saru |
| 1000 | Matsumoto | 4 | Yama |
| 1000 | Matsueda | 3 | Shoji |
| 1001 | .. | .. | .. |

DELIVERY TABLE

FIG. 7

ERROR DOCUMENT MANAGEMENT TABLE

| SENDER ID (701) | DOCUMENT ID (702) | DESTINED USER NAME (703) | FILE NAME (704) | INCOMING TIME (705) |
|---|---|---|---|---|
| 03-1234-4321 | 0021 | Abe | "tmp/rx0000.mmr" | 13:30 |
| 045-9876-5432 | 1322 | Matsueda | "tmp/rx0002.mmr" | 15:00 |
| 03-1111-2222 | 5342 | Abe | "tmp/rx0003.mmr" | 15:15 |

FIG. 9

PRINT DOCUMENT TABLE

| SENDER ID (901) | DOCUMENT ID (902) | DESTINED USER NAME (903) | FILE NAME (904) | INCOMING TIME (905) |
|---|---|---|---|---|
| 03-1234-4321 | 0021 | Abe | "tmp/rx0000.mmr" | 13:30 |

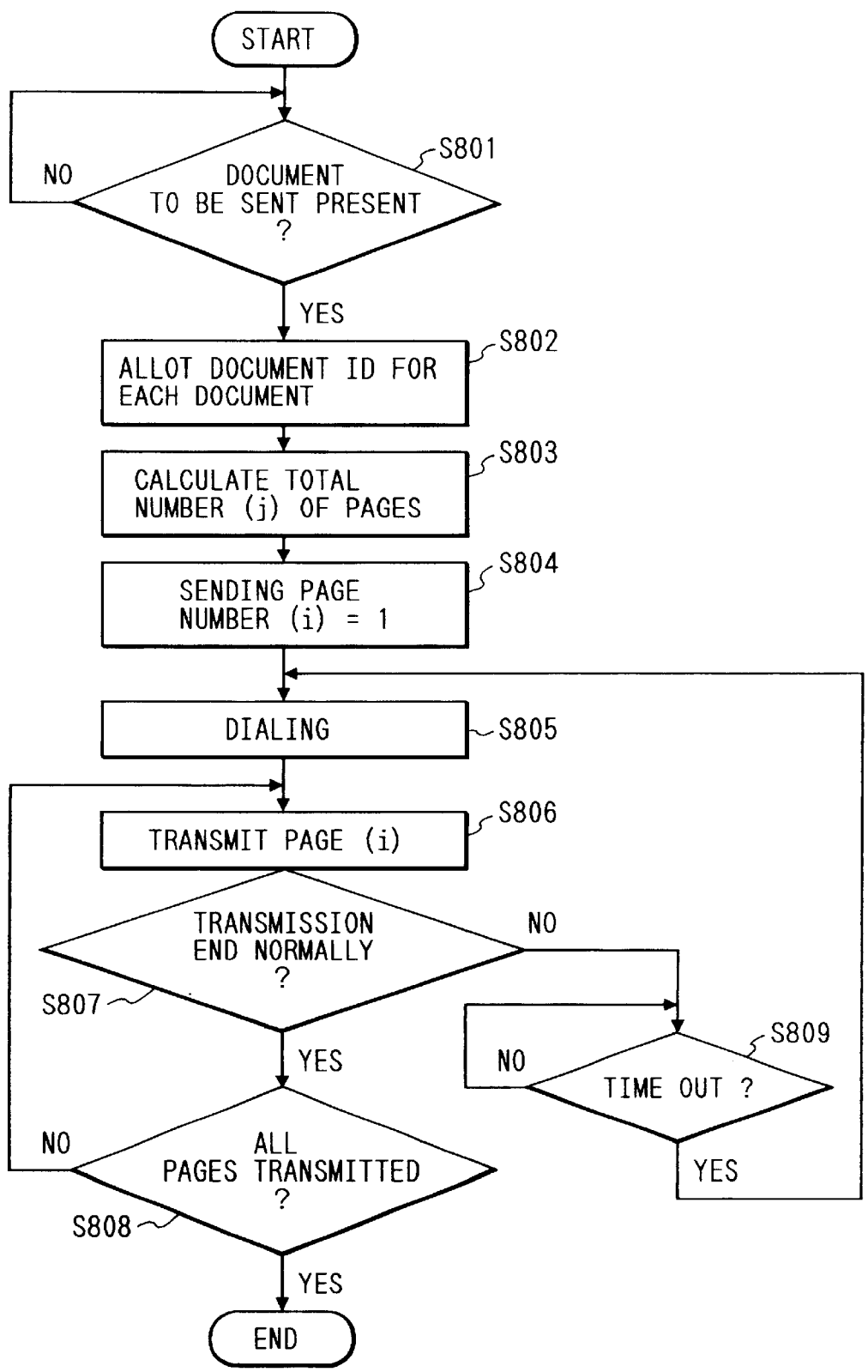

DATA COMMUNICATION APPARATUS FOR COMBINING DATA WITH THE SAME IDENTIFICATION INFORMATION

BACKGROUND OF THE INVENTION

1. Field of the Invention

The present invention relates to a facsimile apparatus, and more particularly to a facsimile apparatus for reconnecting a call for transmission at a communication error. It further relates to a facsimile apparatus for receiving such communication.

2. Related Background Art

In the past, a facsimile which reconnects a call to retry the transmission of all transmission data when an error occurs during the transmission has been known. On the other hand, in a receiving station, no discrimination has been made for the transmission by recalling and the transmission by other means.

Accordingly, in the prior art, it is not possible to discriminate whether the document received relates to the retransmitted document due to the error at the receiving station or a newly received separate document. As a result, the first received document and the error retransmitted document are separately managed and printed out. In such a case, it may happen that a totally different document is inserted between the first received document and the error retransmitted document and this makes the user operability poor.

In a system in which a receiving station facsimile is connected to a LAN, when the presence of a document received by the facsimile is to be noticed to a terminal on the LAN by a mail, a user on the terminal who receives the document must decode the contents of the first received document and the error retransmitted document to determine whether they are related documents or not.

SUMMARY OF THE INVENTION

It is an object of the present invention to provide a facsimile apparatus which does not need to retransmit an entire document when an error occurs.

BRIEF DESCRIPTION OF THE DRAWINGS

FIG. 4 shows a format of a distribution table which is present on LAN-FAX used in the embodiment, FIG. 7 shows a format of an error document management table in the embodiment, FIG. 8 shows a transmission flow in a transmitting facsimile in the embodiment, and FIG. 9 shows a format of a print document table in the embodiment,

DETAILED DESCRIPTION OF THE PREFERRED EMBODIMENTS

Figure 1:
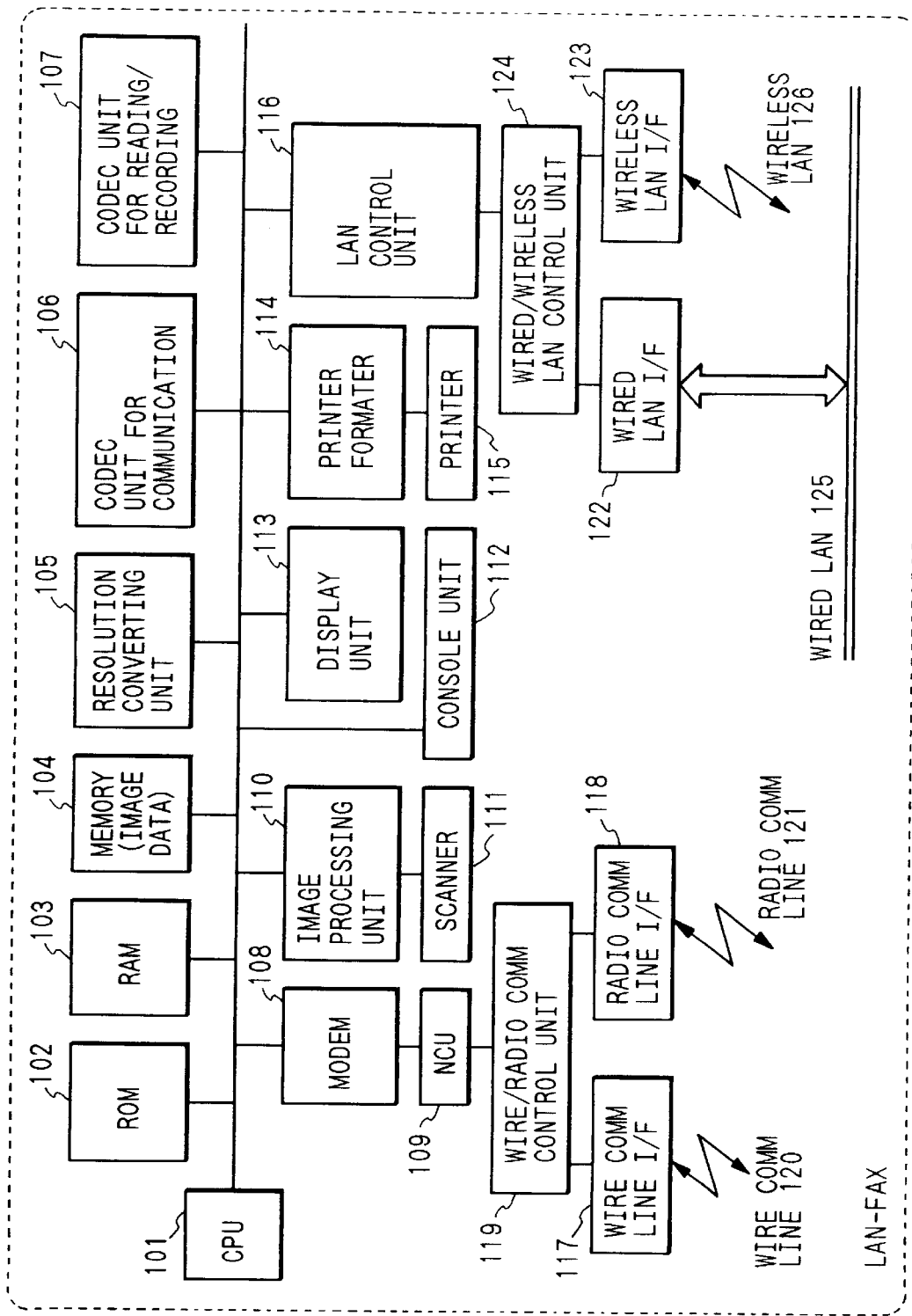
FIG. 1 shows a block diagram of a configuration of a facsimile apparatus in accordance with an embodiment.

FIG. 1 shows a block diagram of a configuration of a facsimile apparatus of the present invention. In FIG. 1, a CPU 101 is a system control unit which controls an entire apparatus. A ROM 102 stores a control program. A RAM 103 comprises an SRAM and stores program control variables. It also stores settings registered by an operator, control data of the apparatus and various work buffers. A memory 104 comprises a DRAM and stores image data. A resolution conversion unit 105 conducts resolution conversion control such as millimeter-to-inch conversion of the image data. A communication coding/decoding unit 106 conducts coding for communication when a coding scheme for the reading and the recording is different from a coding scheme for the communication. A read/record coding/decoding unit 107 conducts coding and decoding of the image data at the reading and the recording. A MODEM 108 modulates and demodulates the transmitted and received signals of the facsimile. An NCU 109 has a function to send a selection signal (dialing pulse or tone dialer) to a wired communication line 120 through a wired line i/f 117 or to a radio or wireless communication line 121 through a radio or wireless line i/f 118 and conducts automatic call reception by detecting a calling tone. A wired/radio (or wireless) line control unit 119 conducts control of the wired line i/f 117 and the radio line i/f 118. A scanner 111 comprises a CS image sensor and a document sheet feed mechanism and optically reads a document sheet and converts it to electrical image data. An image processing unit 110 applies correction to the read image data to output fine image data. A console unit 112 comprises a keyboard by which an operator enters various inputs. An external display unit 113 displays to a user through an LCD or LED. A printer formatter 114 analyzes a printer description language to convert it to the image data when file data from a workstation is to be printed out. A printer 115 records received image and file data on a recording sheet. Wired LAN i/f 122 and wireless or radio LAN i/f 123 are interfaces to connect the facsimile to a wired LAN 125 and a wireless LAN 126, respectively, and the wired LAN i/f 122 and the wireless LAN i/f 123 are controlled by a wired/wireless (or radio) LAN control unit 124. A LAN control unit 116 processes data to exchange data with a server or terminal on the wired LAN or the wireless LAN.

Figure 2:
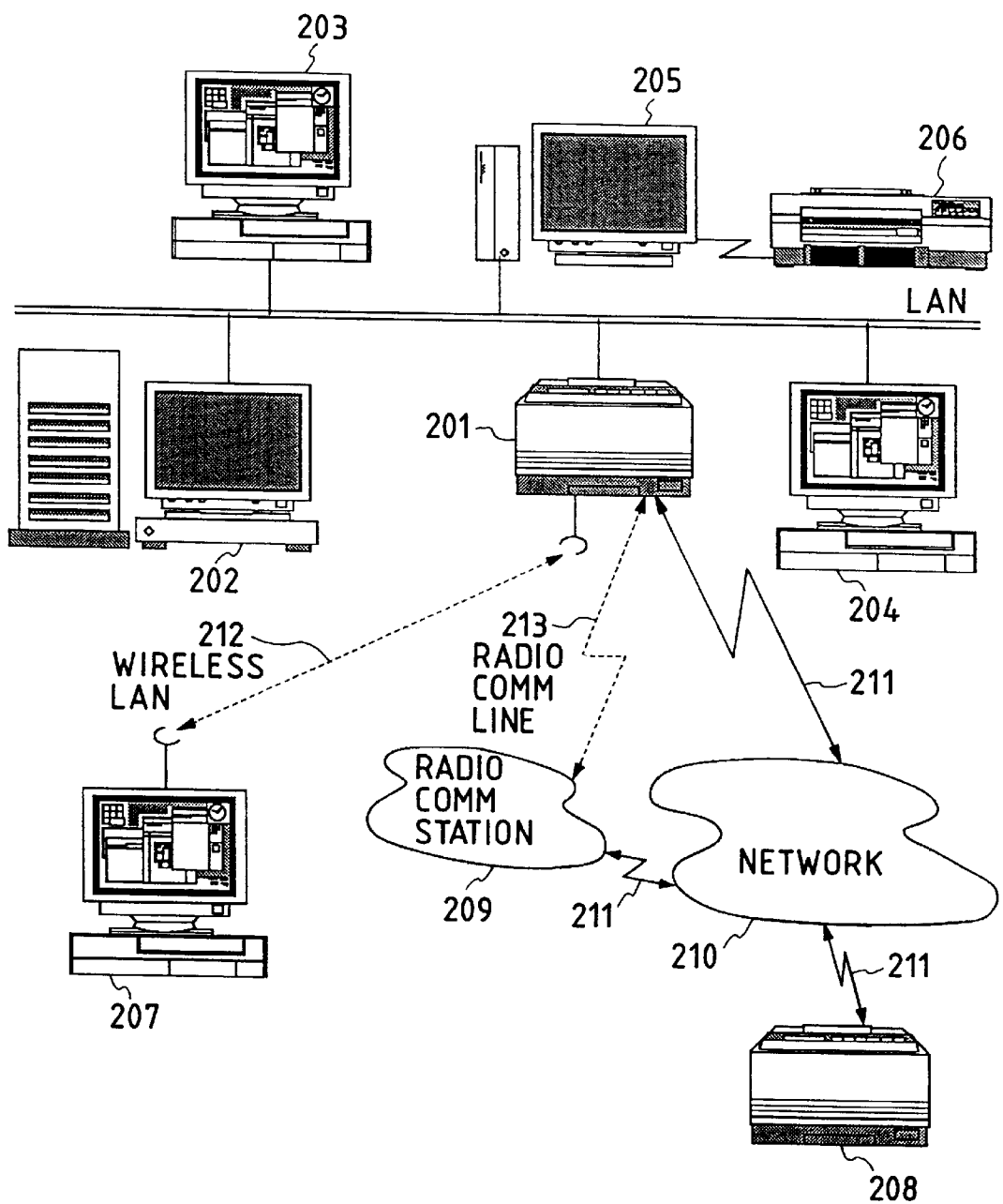
FIG. 2 shows a connection configuration of the embodiment.

FIG. 2 shows a connection configuration of the present invention.

Numeral 201 denotes a facsimile apparatus of the present invention which can be directly connected to the wired and wireless LANs.

Numeral 202 denotes a server machine of the LAN connected to the facsimile apparatus to manage the LAN and the files on the LAN.

Numerals 203 and 204 denote client machines (information processing terminals) (WS-1 and WS-2) connected to the wired LAN.

Numeral 205 denotes a printer server which receives a print request from the client machine and controls the print-out, and numeral 206 denotes a printer for outputting print image data.

Numeral 207 denotes a client machine (WS-3) connected to the wireless LAN.

Numeral 208 denotes a facsimile which conducts communication with the above facsimile apparatus through a telephone line.

Numeral 209 denotes a wireless (or radio) base station which conducts facsimile communication through the facsimile apparatus and the wireless line.

Numeral 210 denotes a network and numeral 211 denotes a telephone line connecting the facsimile and the wireless base station to the network.

Numeral 212 denotes a wireless or radio LAN comprising a facsimile apparatus having a wireless or radio LAN interface and a client machine.

Numeral 213 denotes a radio or wireless line connecting the facsimile apparatus and the radio or wireless base station through a radio or wireless line interface.

Figure 3:
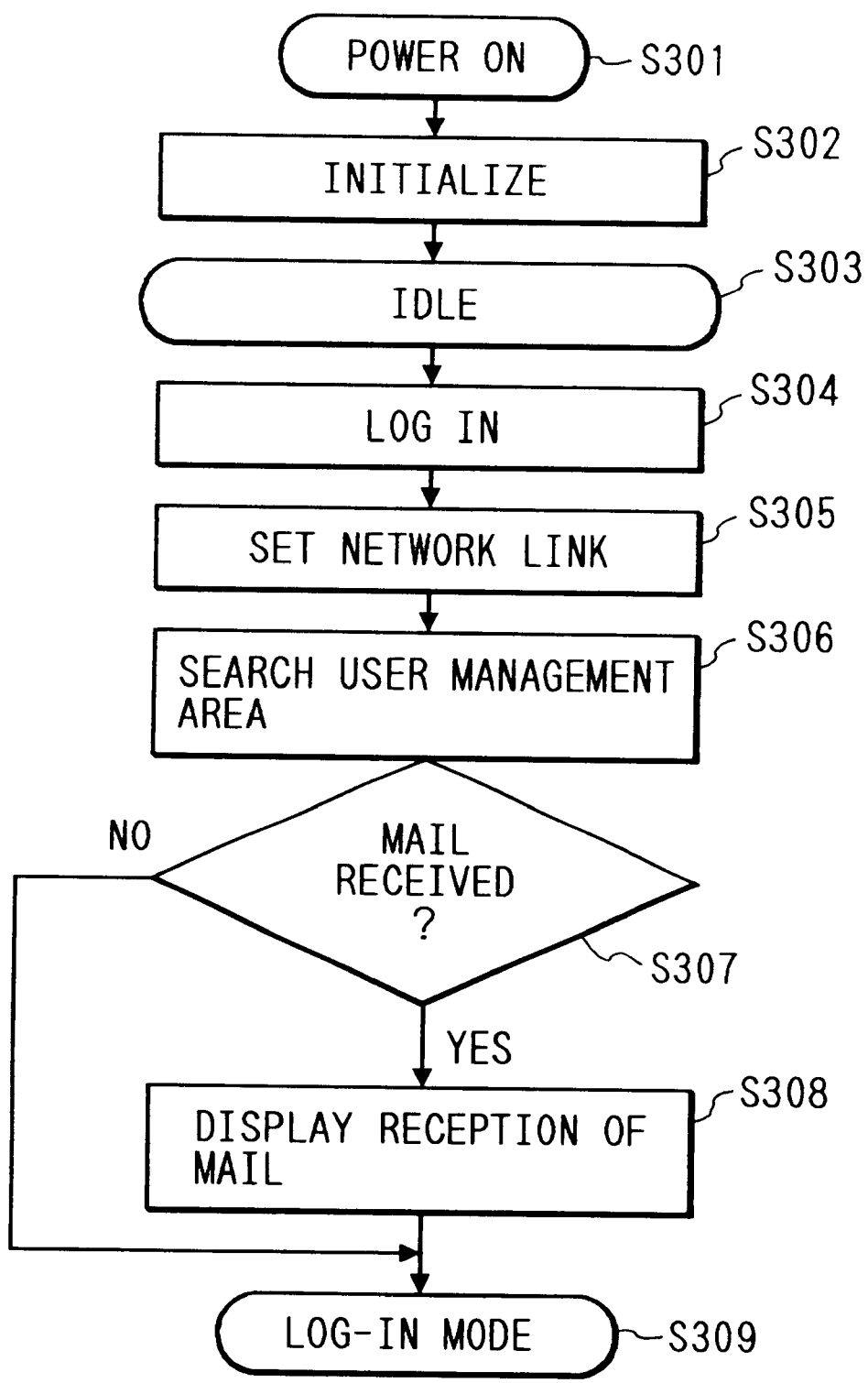
FIG. 3 shows a flow chart after power-on in a network terminal.

FIG. 3 shows a flow chart of a process after the power-on in a conventional network terminal. It shows a flow when 203 or 204 in FIG. 2 is started up. In FIG. 3, S301 indicates that the power has been turned on. S302 is a step to initialize the hardware and S303 is an idle state in which a conventional stand-alone terminal has been started up. The terminal device conducts the following steps automatically or by a user operation for the connection with the LAN. S304 is a log-in step to participate a specific network of the connected LAN. In this step, a user name is entered or a server name that manages a network to which the participation is to be made.

S305 is a network link setting step to conduct initial communication relating to the log-in between the conventional terminal device and the server 202. By this step, the log-in of 203 and 204 are registered on the server 202 and managed thereby. S306 is a step to search a user management area which is managed for each user that logs in on the server 202. S307 is a step to confirm whether a received mail is present in the user management area or not before the user logs in. If the mail is present, it is displayed on the display in S308. Then, in a log-in mode of S309 in which the terminal device may operate in either as a stand-alone machine or as the terminal on the network.

FIG. 4 shows a distribution table used in the LAN-FAX of the present invention. The distribution table shown in FIG. 4 is present on the RAM 103 and may be updated periodically or updated by the user of the LAN-FAX. Numeral 401 denotes an area which stores a network number which may be present in multiple on the same LAN, numeral 402 denotes a user name used at the log-in and numeral 403 denotes a priority field indicating a user name to which non-destination data received from the line is to be distributed. In the present example, the user designated by 1 is a first candidate of the distribution addressee. Numeral 404 denotes an alternative user name that receives data in place of the user designated for reception from the line when the designated user does not log in. The control which uses the present table is explained with reference to FIGS. 5 and 6.

Figure 5:
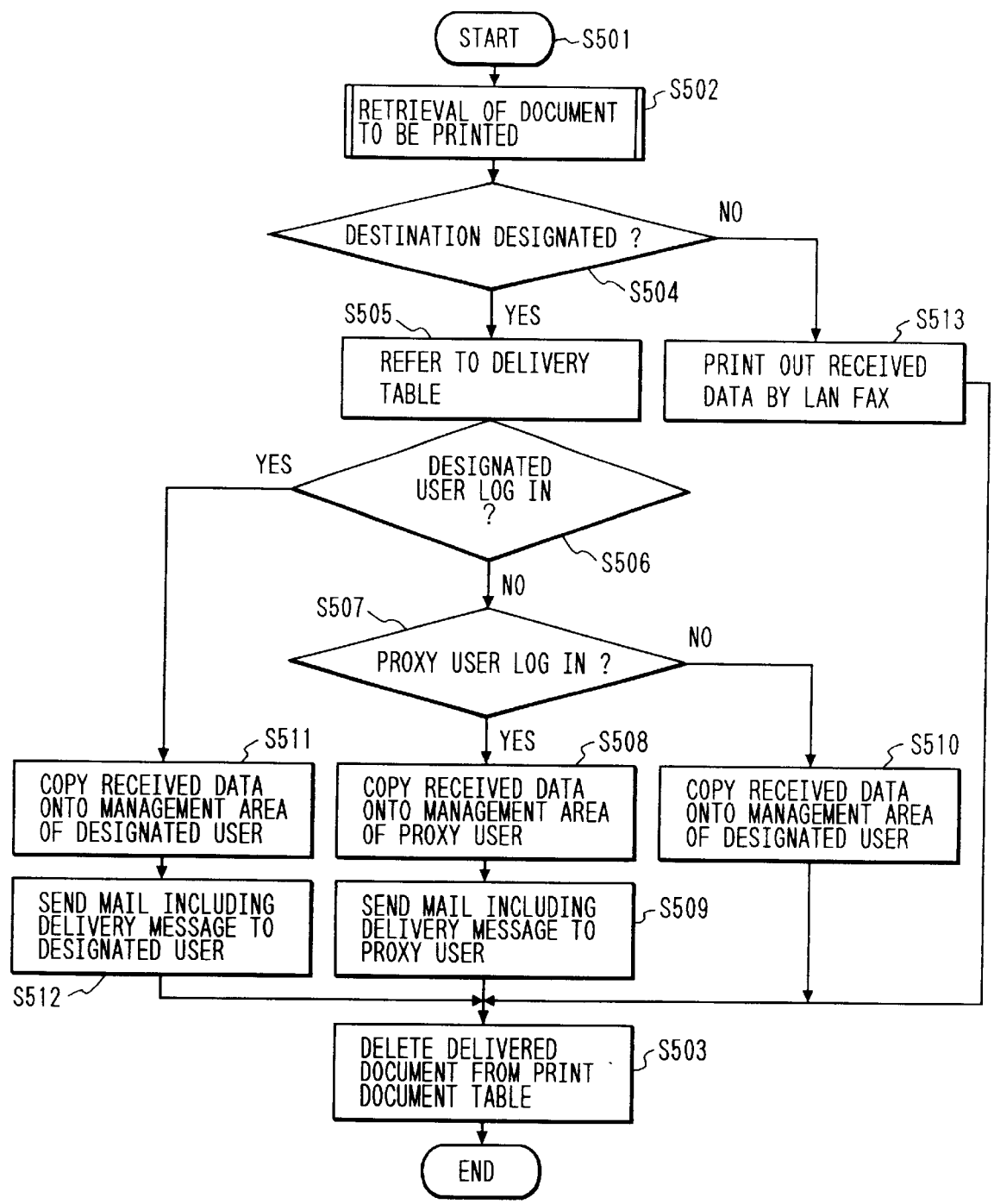
FIG. 5 shows a flow chart of control of proxy reception in the embodiment.

FIG. 5 shows a control flow of the proxy or alternative reception when the LAN-FAX apparatus 201 of the present invention receives data from the FAX 208 through the line 211. Referring to FIG. 5, the present invention is explained in detail, S501 is a print output waiting state (start). In S502, a received document to be printed out is searched. If the document to be printed out is present, the information thereof is registered in the print document table and the process proceeds to S504. The process in S502 and the print document table will be described later. In S504, the print document table is referred to determine whether the destination of the terminal on the LAN to which the data is to be distributed when the data is received has been designated from the transmitting station or not. If the distribution destination has not been designated, the process proceeds to S513 to print out the data by the LAN-FAX 201 itself and the process proceeds to S503. If the distribution destination has been designated, the distribution table shown in FIG. 4 is referred, and in S506, whether the designated user name is logged in or not is determined. If it is logged in, the process proceeds to S511 to copy the received data to the management area of the designated user on the server 202. In S512, a distribution mail including a message indicating the distribution such as "data has been received from XXX" is sent to the terminal device on which the designated user is logged in and the process proceeds to S503. In S506, if the user designated by the FAX 208 is not logged in, the following proxy or alternative reception operation is conducted. For example, when a mail addressed to Abe as shown in FIG. 4 has been received but Abe has not logged in, the process proceeds to S507 to determine whether Saru has logged in while Abe has not logged in. If Saru has logged in, the process proceeds to S508 to copy the received data to the management area of the proxy or alternative user on the server 202. In S509, a distribution mail including a message indicating the distribution such as "data. from XXX has been received" is sent to the terminal device at which the alternative user has logged in. Then, the process proceeds to S503. In S507, if it is determined that the alternative user has not logged in, the process proceeds to S510 to copy the received data to the management area of the designated user on the server 202 and the process proceeds to S503.

In S503, the document is deleted from the print document table. Specifically, the file name of the print document table is changed to " ". As described above, in the present sequence, when the terminal at which the designated user or the alternative user has logged in is not present, the mail is not sent. When the data with the user designation is received from the transmitting station, the facsimile apparatus does not print out the data by itself. Namely, the security of the communication is held when the data is received with the user destination from the transmitting station.

Figure 6:
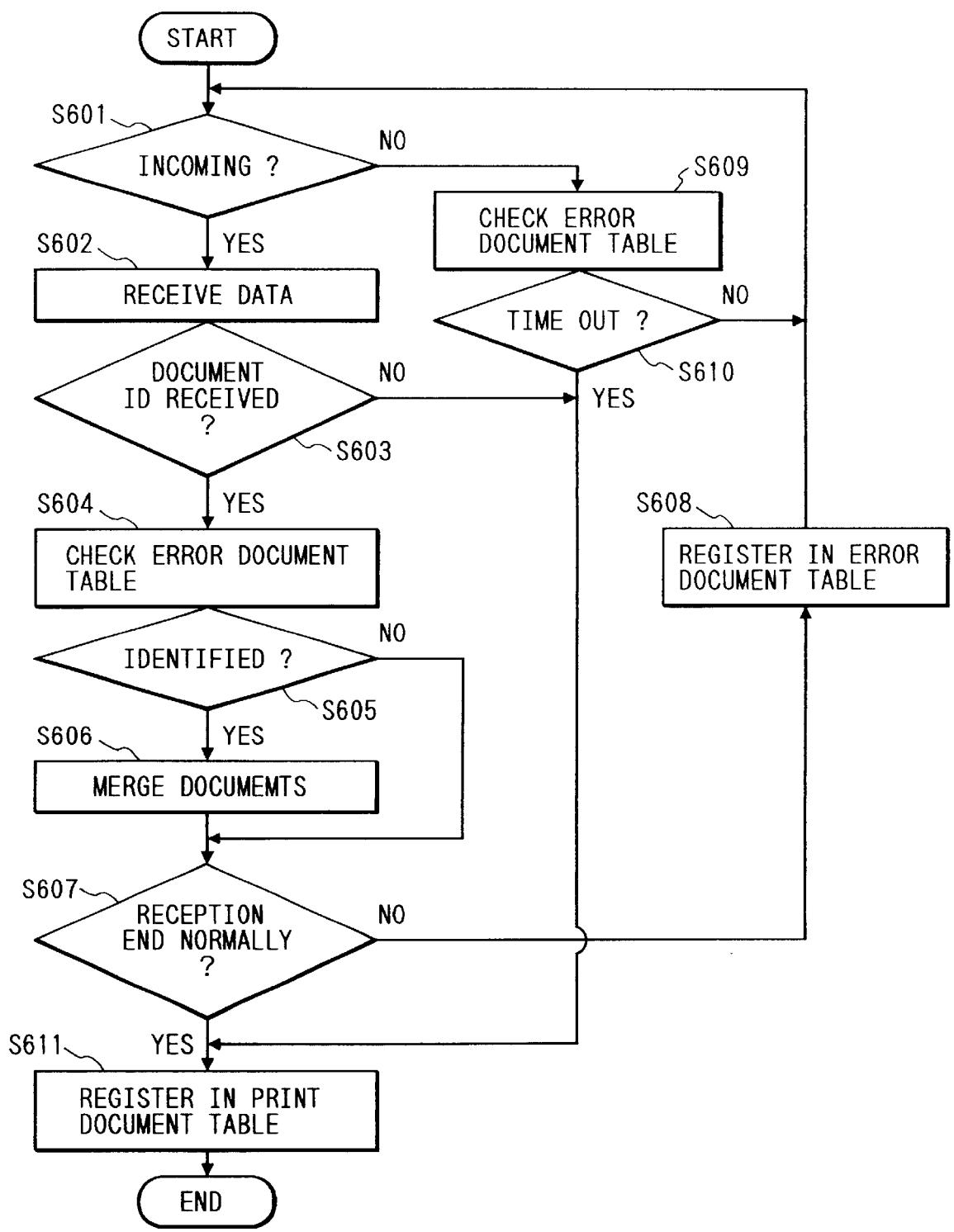
FIG. 6 shows a flow chart for searching a received document to be printed out used in the embodiment.

FIG. 6 shows a flow to search the received document to be printed out in S502. In S601, whether the reception has been made or not is determined, and if it has, the process proceeds to S602. If it has not, the process proceeds to S609. In S602, the image is received and the received image is stored in the memory. In this case, if the transmitting station is the same facsimile as that of the present invention, (1) a sending station ID, (2) a document ID, (3) total number of pages of transmitting document, (4) a starting page number and (5) a destination user name are received in the G3 facsimile protocol signal (NSS). After the completion of the reception, the process proceeds to S603.

If the document ID is received in S603, the process proceeds to S604, and if it is not received, the process proceeds to S611. In a facsimile which does not conduct the process shown in FIG. 8 to be described later, the document ID is not sent and the process proceeds to S611.

In S604, whether the document is the retransmitted document for the previously received error document or not is determined. An error document management table used here is shown in FIG. 7. The document which caused error at the reception is stored in the table.

Numeral 701 denotes a received sending station ID, numeral 702 denotes a received document ID and numeral 703 denotes a received destination user name.

Numeral 704 denotes a file name used to store the received document in the memory 104 and numeral 705 includes a reception time. In S604, a document for which both the sending station ID and the document ID received in S602 correspond is searched from the error document management table. In S605, if the corresponding document searched in S604 is found, the process proceeds to S606 and if it is not found, the process proceeds to S607. In S606, the currently received document is linked to the previously received document. In S605, the document is retrieved by using the file name of the matched received document and the currently received document is linked to the rear of the file. After the linking, the previously received document is deleted from the error document management table.

In S607, whether the currently received communication has terminated normally or not is determined. If the total number of pages of the transmitting document received in S602 have been received, the process is terminated, otherwise the process proceeds to S608. In S608, the currently received document is added to the error document management table and the process returns to S601.

S609 and S610 prevent the continuation of the non-printout status when the received document is in error but it is not retransmitted. In S609, the reception time of the error document management table and the current time are compared. In S610, if there is a received document for which a predetermined time, for example, one hour, has elapsed, the process proceeds to S611, otherwise the process proceeds to S601.

In S611, the document to be printed out is registered in the print document management table shown in FIG. 9. Referring to FIG. 9, the print document management table is explained. Basically, it has the same format as that of the error document management table of FIG. 7. Numeral 901 denotes a received sending station ID, numeral 902 denotes a received document ID and numeral 903 denotes a received destination user ID. When the destination user ID is not received, " " is stored. Numeral 904 denotes a file name used to store the received document and numeral 905 stores a reception time. When those data have been registered, the search of the document to be printed out is terminated and the process returns to S504.

FIG. 8 shows a transmission flow of the transmitting station facsimile of the present invention. The transmitting station facsimile is of the same configuration as that of the facsimile described above. In S801, a document to be transmitted is monitored and the process proceeds to S802. In S802, a document ID which is unique for each document to be transmitted is assigned. Here, the numbers 0000 to 9999 are assigned sequentially. In S803, the total number of pages of the transmitting document is counted. To facilitate the subsequent description, it is designated as (j). In S804, the start page of the transmission is set to 1. To facilitate the subsequent description, it is designated as (i). In S805, call is made and (1) a sending station ID, (2) a document ID, (3) total number of page=j of the transmitting document, (4) a start page number=i of the transmitting document and (5) a destination user name are sent in the protocol signal (NSS) of the G3 facsimile. In S806, the i-th page is transmitted. In S807, if the page transmitted in S806 has been received normally, the process proceeds to S808. If a transmission error is included, the call is disconnected and the process proceeds to S809. In S808, whether all transmitting pages have been transmitted or not is determined, and if there is a page to be transmitted, that is, if i<j, the process returns to S806 to receive the next page. In order to receive the next page, the i is incremented by one. When the transmission of all page has been completed, the call is disconnected and the process is terminated. On the other hand, if the transmission error is included in S807, the process waits for a predetermined time in S809 and after the time out, a call is made. As seen from the flow, in this case, the document ID is the same as that used previously and the start page of the transmission is the next to the previous one.

As described above, by the provision of the ID to determine whether the documents at the transmitting station and at the receiving station are identical or not, the print and reception notice mail can be sent by linking the document to the previously received document at the receiving station if it is the error retransmission document. While the retransmission at the error has been described, the present invention is also applicable when the document must be sent in a plurality of times of communication due to the restriction by the facsimiles at the transmitting station and the receiving station. For example, when a capacity of the image memory of the facsimile is small, the transmission may be made in a plurality of times and they may be printed out at one time at the receiving station.

In accordance with one aspect of the present invention, the document ID and the sending station ID are applied to one document to be transmitted so that the handling at the receiving station is facilitated.

In accordance with another aspect of the present invention, the document which has been received only partially may be held so that it may be linked to the subsequently retransmitted document.

What is claimed is:

1. A data communication apparatus on a local area network, said apparatus comprising:

an input circuit adapted to input data that includes identification (ID) information and, if a destination address is included in the data, the address of a destination on the local area network, wherein said input circuit is a receiver that receives the data from a sender apparatus via a communication line, wherein, if the destination address is included in the data, said apparatus does not print out the data by itself but rather maintains the security of the data with the address of a destination from the transmitting station;

an identifier circuit adapted to identify the ID information and the address of the data received through the receiver, if the address has been received;

a combiner circuit adapted to combine, as composite data, data received through the receiver having a same ID information and a same address in accordance with a result of identification by said identifier circuit, wherein said combiner circuit compares the ID information of data newly inputted through said input circuit with the ID information of data stored in a memory, and, in the case of a match, combines the data newly inputted through the input circuit with the data stored in the memory whose ID information matches that of the newly-inputted data to form the composite data;

a controller adapted to determine whether or not an address has been received in accordance with the result of identification; and a transmitter adapted to, if the address has been received, send the composite data to another apparatus on the local area network having the address of the data forming the composite data, and, if no address has been received, to print the composite data.

2. An apparatus according to claim 1, wherein the local area network is a wireless local area network.

3. An apparatus according to claim 1, wherein the ID information includes sender station information for indicating a station sending the data.

4. An apparatus according to claim 3, wherein the sender station information includes a telephone number of a sending station.

5. An apparatus according to claim 1, wherein the ID information includes document ID information for identifying a document.

6. An apparatus according to claim 5, wherein the document ID information includes a document number.

7. An apparatus according to claim 1, further comprising a memory adapted to store the data inputted through said input circuit with the respective ID information.

8. An apparatus according to claim 7, wherein said combiner circuit stores the composite data in said memory, and said transmitter reads out the composite data from said memory and sends the read-out composite data.

9. An apparatus according to claim 1, wherein the receiver receives the data in accordance with a facsimile procedure.

10. A data communication apparatus on a local area network, said apparatus comprising:
    a receiver adapted to receive data that includes identification (ID) information and, if a destination address is included in the data, the address of a destination on the local area network,
    wherein, if a destination address is included in the data, said apparatus does not print out the data by itself but rather maintains the security of the data with the address of a destination from the transmitting station;
    an identifier circuit adapted to identify the ID information and the address of the data received through said receiver, if the address has been received;
    a control circuit adapted to determine whether or not an address has been received in accordance with an identification result; and
    a transmitter adapted to, if the address has been received, send the data to another apparatus on the local area network having the address of the data, and to, if no address has been received, print the data.

11. An apparatus according to claim 10, wherein said receiver receives the data in accordance with a facsimile procedure.

12. A communication method for a data communication apparatus on a local area network, said method comprising the steps of:
    receiving data that includes identification (ID) information and, if a destination address is included in the data, the address of a destination on the local area network, wherein the data is received from a sender apparatus via a communication line,
    wherein, if the destination address is included in the data, said method does not print out the data by itself but rather maintains the security of the data with the address of a destination from the transmitting station;
    identifying the ID information and the address of the data received in said receiving step, if the address has been received;
    combining, as composite data, data received in said receiving step having a same ID information and a same address in accordance with a result of identification in said identifying step, wherein said combining step includes comparing the ID information of data newly inputted through said input circuit with the ID information of data stored in a memory, and, in the case of a match, combines the data newly inputted through the input circuit with the data stored in the memory whose ID information matches that of the newly-inputted data to form the composite data;
    determining whether or not an address has been received in accordance with the result of identification; and
    if the address has been received, sending the composite data to another apparatus on the local area network having the address of the data forming the composite data, and, if no address has been received, printing the composite date.

13. A method according to claim 12, wherein the local area network is a wireless local area network.

14. A method according to claim 12, wherein the ID information includes sender station information for indicating a station sending the data.

15. A method according to claim 14, wherein the sender station information includes a telephone number of a sending station.

16. A method according to claim 12, wherein the ID information includes document ID information for identifying a document.

17. A method according to claim 16, wherein the document ID information includes a document number.

18. A method according to claim 12, further comprising the step of storing in a memory the data received in said receiving step with the respective ID information.

19. A method according to claim 18, wherein said combining step includes storing the composite data in the memory, and said sending step includes reading out the composite data from the memory and sending the read-out composite data.

20. A method according to claim 12, wherein said receiving step receives the data in accordance with a facsimile procedure.

21. A communication method for a data communication apparatus on a local area network, said method comprising the steps of:
    receiving data that includes identification (ID) information and, if a destination address is included in the data, the address of a destination on the local area network,
    wherein, if a destination address is included in the data, said method does not print out the data by itself but rather maintains the security of the data with the address of a destination from the transmitting station;
    identifying the ID information and the address of the data received in said receiving step, if the address has been received;
    determining whether or not an address has been received in accordance with an identification result; and,
    if the address has been received, sending the data to another apparatus on the local area network having the address of the data, and, if no address has been received, printing the data.

22. A method according to claim 21, wherein said receiving step receives the data in accordance with a facsimile procedure.

* * * * *

UNITED STATES PATENT AND TRADEMARK OFFICE
CERTIFICATE OF CORRECTION

PATENT NO. : 6,433,893 B1
DATED : August 13, 2002
INVENTOR(S) : Masahiro Murayama It is certified that error appears in the above-identified patent and that said Letters Patent is hereby corrected as shown below:

<u>Drawings,</u>
Sheet 1, Fig. 1, "FORMATER" should read -- FORMATTER --.

<u>Column 1,</u>
Line 31, "noticed" should read -- notified --.
Line 61, "embodiment," should read -- embodiment. --.

<u>Column 3,</u>
Line 15, "participate" should read -- participate in --.
Line 28, "S309 in which" should read -- S309, --.
Line 29, "in" should be deleted.

<u>Column 4,</u>
Line 8, "a" should be deleted.

<u>Column 5,</u>
Line 46, "page=j" should read -- pages=j --.
Line 58, "page" should read -- pages --.
Line 61, "out" should read -- runs out --.

<u>Column 8,</u>
Line 10, "date." should read -- data. --.

Signed and Sealed this

Eleventh Day of February, 2003

JAMES E. ROGAN
*Director of the United States Patent and Trademark Office*